(12) United States Patent
Biolchini, Jr.

(10) Patent No.: US 7,040,218 B1
(45) Date of Patent: May 9, 2006

(54) STIRRING COFFEE PRESS

(76) Inventor: Robert F. Biolchini, Jr., 692 E. Hansen, Jackson, WY (US) 83001

( * ) Notice: Subject to any disclaimer, the term of this patent is extended or adjusted under 35 U.S.C. 154(b) by 64 days.

(21) Appl. No.: 10/686,405

(22) Filed: Oct. 15, 2003

(51) Int. Cl.
*A47J 31/20* (2006.01)

(52) U.S. Cl. .......................................... 99/297; 99/287

(58) Field of Classification Search ................ 99/297, 99/287; 16/422, 111.1, 110.1, 421
See application file for complete search history.

(56) References Cited

U.S. PATENT DOCUMENTS

| | | | |
|---|---|---|---|
| 1,346,485 A * | 7/1920 | De Arrigunaga | 99/297 |
| 2,459,498 A * | 1/1949 | Cameron | 99/287 |
| 2,562,433 A | 7/1951 | Moore | |
| 3,307,474 A | 3/1967 | Kasher | |
| 3,927,608 A | 12/1975 | Doyel | |
| 5,461,968 A | 10/1995 | Portman | |
| 5,544,566 A | 8/1996 | Bersten | |
| D441,248 S | 5/2001 | Brady | |
| 6,240,833 B1 | 6/2001 | Sham et al. | |
| 6,324,966 B1 | 12/2001 | Joergensen | |
| 6,324,967 B1 * | 12/2001 | Robinson | 99/297 |
| 6,422,133 B1 | 7/2002 | Brady | |

FOREIGN PATENT DOCUMENTS

WO  WO 02067739 A1  9/2002

* cited by examiner

*Primary Examiner*—Reginald L. Alexander
(74) *Attorney, Agent, or Firm*—David A. Guerra (57) ABSTRACT

A stirring coffee press for brewing beverage grounds, such as coffee or tea, while simultaneously compressing and agitating the grounds in a single container. The stirring coffee press includes a container with a fitted lid, a plunger assembly slidably and rotatably received within the container and being attached to a hollow shaft which extends out through an opening in the lid, and a blade assembly attached to a shaft that extends and exits through the hollow shaft of the plunger assembly. The hollow shaft of the plunger assembly has a handle attached to the end of the hollow shaft, wherein the plunger handle is adapted to be received and retained into the aperture in the lid, thereby preventing the plunger assembly from rotating. The blade assembly shaft has a knob attached to its open end allowing the blade assembly to be freely rotated.

16 Claims, 10 Drawing Sheets

STIRRING COFFEE PRESS

BACKGROUND OF THE INVENTION

1. Field of the Invention

The present invention relates to a stirring coffee press for use in connection with manually or electrically operated portable coffee brewing presses. The stirring coffee press has particular utility in connection with the agitating and compressing of coffee grounds in a coffee press.

2. Description of the Prior Art

There have been coffee presses used for the brewing of coffee and tea in the beverage industry, such as French Coffee Presses. These coffee presses all function in similar fashion, wherein ground coffee, tea, or the like is placed in the bottom of a container, usually made of plastic or glass. Hot water is then added into the container so as to combine with the ground coffee. A plunger is then inserted into the container from an opening located at the top of the container, and pushed in a downwardly direction just far enough to submerge the grounds allowing for a curing process. A predetermined amount of time is needed for the curing process, and after this time the plunger is pushed further down forcing the grounds to the bottom of the container. There are some beliefs that the time of the curing process corresponds directly with the strength of the brewed beverage, while a second belief is that the flavor is enhanced by squeezing the grounds at the bottom of the container.

A major disadvantage with these coffee presses is that when the plunger is being pushed down during the curing process the grounds can form a plug which makes it difficult to push the plunger to the bottom. The plug prevents the fluid from passing through the plunger. Furthermore, another disadvantage with the use of these coffee presses is that after the plunger has been pushed to the bottom of the container, a vacuum may be formed between the plunger and the bottom of the container. The vacuum makes it very difficult to remove the plunger from the container.

One solution in which coffee press users have used to separate the grounds or enhance the flavor of the coffee is to stir the grounds while in the container. The user usually uses a stirring utensil. This practice is dangerous in that when using glass containers the boiling water in the container makes the glass very brittle and therefore susceptible to breaking when the utensil impacts the sidewall of the glass container.

Stirring coffee presses are desirable for safely and effectively brewing coffee in a container while agitating the grounds and enhancing the flavor of the beverage.

The use of coffee presses is known in the prior art. For example, U.S. Pat. No. 5,461,968 to Portman discloses an improved brewing pot having a cylindrical container, a lid and a rotatable overlay member connected to a hollow shaft extending up through the lid. Furthermore, the improved brewing pot contains an adjustable handle attachable to the hollow shaft, a screen attached to a central shaft and insertable through and exist out from the hollow shaft and adjustable handle, and a fixed cap that is attached to the top of the central shaft. The Portman '968 patent does not disclose a propeller assembly located below a plunger, wherein the propeller assembly is rotated by a solid shaft that passes through a hollow shaft. Furthermore, the Portman '968 patent makes no provisions for the use of a multiple level screen and plunger assembly attached to a hollow shaft, or a recess in the lid which retains the plunger handle and prevents the handle from rotating.

U.S. Pat. No. 5,544,566 to Bersten discloses a two stage coffee plunger having a cylindrical container, a lid, a plunger assembly featuring a plunger shaft extending upwardly from the lid, and a baffle including a second shaft extending through and exiting out from the plunger shaft. However, the Bersten '566 patent does not disclose a recess in the lid which retains a plunger handle and prevents the handle from rotating. Furthermore, the Bersten '566 patent does not teach the use of a stirring blade assembly.

In addition, U.S. Pat. No. 6,422,133 to Brady discloses a French coffee press having a cylindrical container, a lid featuring a recess, a screen and buffer assembly connected to a shaft, and a knob attached to the top of the shaft and retained in the recess of the lid. However, the Brady '133 patent does not disclose an upper baffle element located between the screen and buffer, and additionally does not teach the use of a stirring blade assembly Similarly, U.S. Pat. No. 6,324,966 to Joergensen discloses a piston-type coffee maker having a cylindrical container, a lid featuring a recess, a screen attached to a piston, a piston rod connected to the piston, and a pressure handle attached to the piston rod and retaining in the recess of the lid. However, the Joergensen '966 patent makes no provisions for the use of a dual shaft system, a stirring blade assembly, or a multiple level screen and plunger system.

Lastly, U.S. Pat. No. 3,927,608 to Doyel discloses a beverage making device having a tubular container, a lid, and a moveable piston including a handle.

Additionally, further examples of known coffee press systems are found in U.S. Pat. No. 6,240,833 to Shame et al.; U.S. Pat. No. 3,307,474 to Kasher; U.S. Pat. No. 2,562,433 to Moore; United States Design Pat. No. Des. 441,248 to Brady; and International Publication Number WO 02/067739 to Munkager et al. While each of these systems may provide for the brewing of pressed beverages, they do not teach the use a multiple level screen and plunger assembly attached to a hollow shaft, and a stirring blade assembly attached to a shaft extending through the hollow shaft.

While the above-described devices fulfill their respective, particular objectives and requirements, the aforementioned patents do not describe a stirring coffee press that allows the agitating and compressing of coffee grounds in a coffee press, through the use of a multiple level screen and plunger assembly attached to a hollow shaft, and a stirring blade assembly attached to a shaft extending through the hollow shaft.

Therefore, a need exists for a new and improved stirring coffee press that can be used for the agitating and compressing of coffee grounds in a coffee press. In this regard, the present invention substantially fulfills this need. In this respect, the stirring coffee press according to the present invention substantially departs from the conventional concepts and designs of the prior art, and in doing so provides an apparatus primarily developed for the purpose of the agitating and compressing of coffee grounds in a coffee press.

SUMMARY OF THE INVENTION

In view of the foregoing disadvantages inherent in the known types of coffee presses now present in the prior art, the present invention provides an improved stirring coffee press, and overcomes the above-mentioned disadvantages and drawbacks of the prior art. As such, the general purpose of the present invention, which will be described subsequently in greater detail, is to provide a new and improved stirring coffee press and method which has all the advantages of the prior art mentioned heretofore and many novel features that result in a stirring coffee press which is not anticipated, rendered obvious, suggested, or even implied by the prior art, either alone or in any combination thereof.

To attain this, the present invention essentially comprises a container having an open top, a lid removably attached to the container and positioned to cover the open end of the container, an agitating blade assembly slidably inserted into the container, and a plunger assembly slidably inserted into the container above the agitating blade assembly. The agitating blade assembly can be rotated independently from the plunger assembly.

The plunger assembly may also comprise a perforated compression plate attached to the bottom end of a shaft, a screen plate attached to the bottom of the shaft below the compression plate, and a bottom plate threadably attached to the bottom end of the hollow shaft below the screen plate thereby retaining the compression plate and the screen plate to the bottom end of the shaft.

There has thus been outlined, rather broadly, the more important features of the invention in order that the detailed description thereof that follows may be better understood and in order that the present contribution to the art may be better appreciated.

The invention may also include a blade assembly attached to the bottom end of a blade shaft, wherein the shaft is inserted and extending out from the hollow shaft. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved stirring coffee press that has all of the advantages of the prior art coffee presses and none of the disadvantages.

It is another object of the present invention to provide a new and improved stirring coffee press that may be easily and efficiently manufactured and marketed.

An even further object of the present invention is to provide a new and improved stirring coffee press that has a low cost of manufacture with regard to both materials and labor, and which accordingly is then susceptible of low prices of sale to the consuming public, thereby making such stirring coffee press economically available to the buying public.

Still another object of the present invention is to provide a new stirring coffee press that provides in the apparatuses and methods of the prior art some of the advantages thereof, while simultaneously overcoming some of the disadvantages normally associated therewith.

Even still another object of the present invention is to provide a stirring coffee press for the agitating and compressing of coffee grounds in a coffee press. This allows for the separation of compressed coffee grounds from the screen or plunger.

Furthermore, yet still another object of the present invention is to provide a stirring coffee press that provides a system for pressing and agitating beverage grounds in a single unit.

Lastly, it is an object of the present invention to provide a new and improved method of brewing a beverage by placing beverage grounds in the bottom of a container, then adding hot water into the container. Inserting an agitating blade assembly into the container, and then placing a plunger assembly into the container above the blade assembly. The plunger and blade assembly are pushed downwardly to compress the beverage grounds, while at the same time the blade assembly is rotated to prevent the production of a beverage ground plug and to enhance the flavor of the beverage. After a sufficient amount of time and when the liquid has been poured from the container, the blade assembly is rotated and the plunger and blade assembly is removed from the container. The rotating of the blade assembly during the removal process ensures that a vacuum is not produced at the bottom of the container, thereby making the removal of the plunger and blade assembly difficult.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Referring now to the drawings, and particularly to FIGS. 1–9, a preferred embodiment of the stirring coffee press of the present invention is shown and generally designated by the reference numeral 10.

Figure 1:
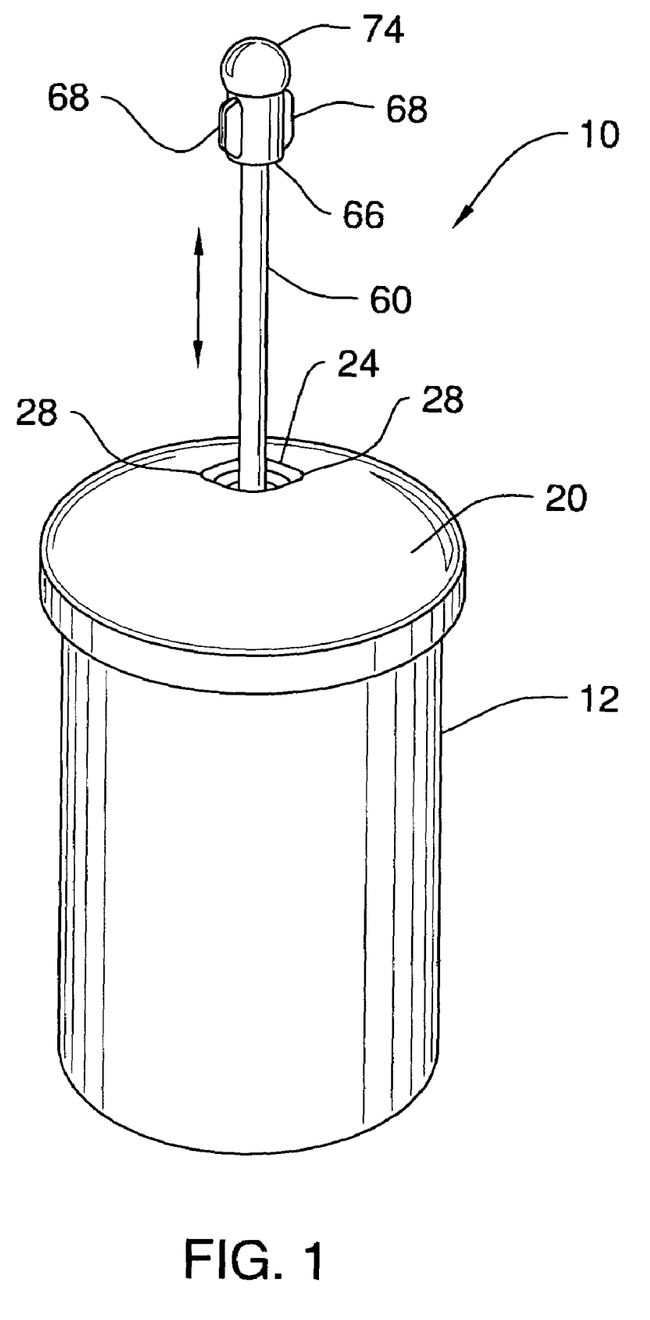
FIG. 1 is a perspective view of the preferred embodiment of the stirring coffee press constructed in accordance with the principles of the present invention.
Figure 4:
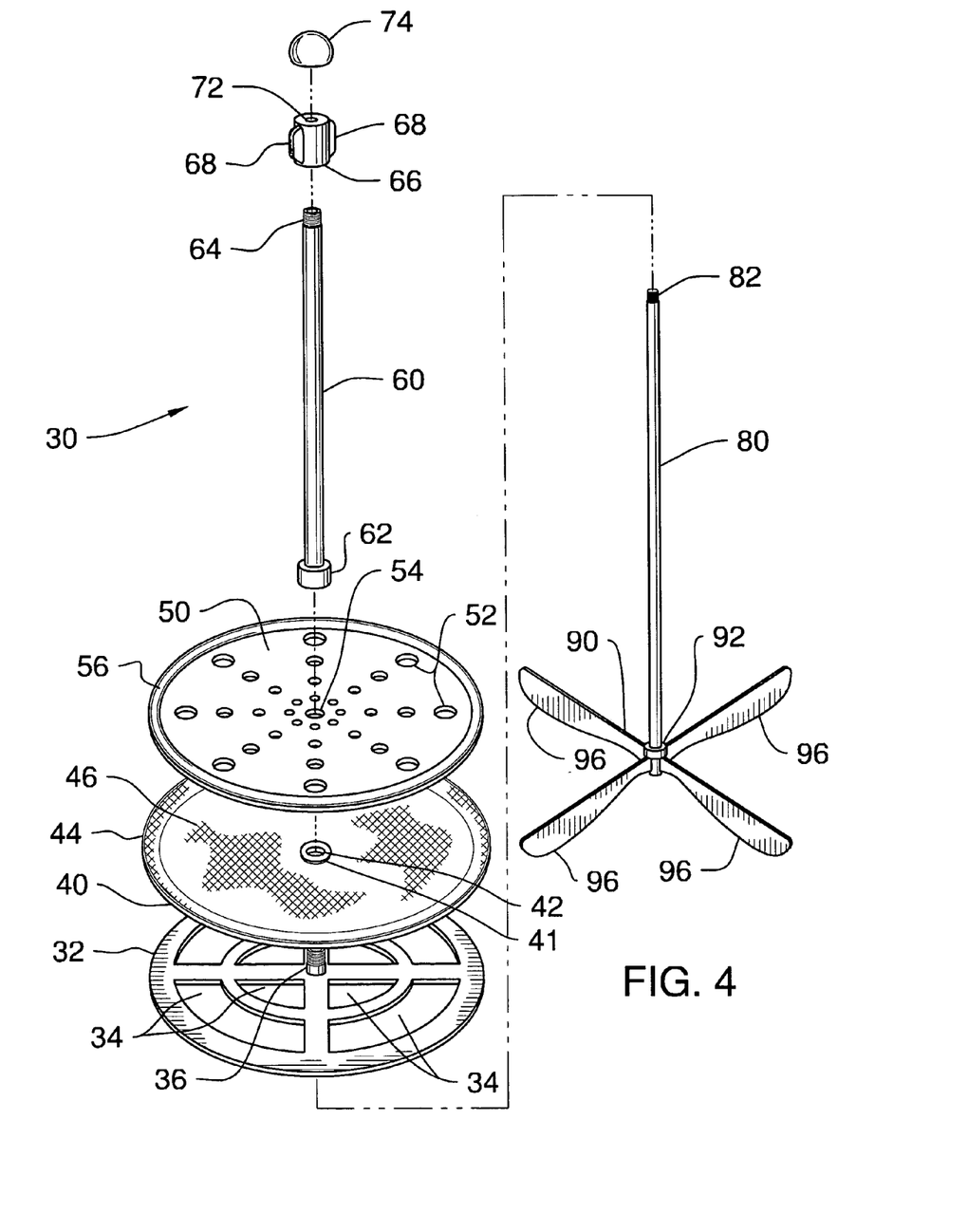
FIG. 4 is an exploded perspective view of the plunger and blade assembly of the stirring coffee press of the present invention.
Figure 5:
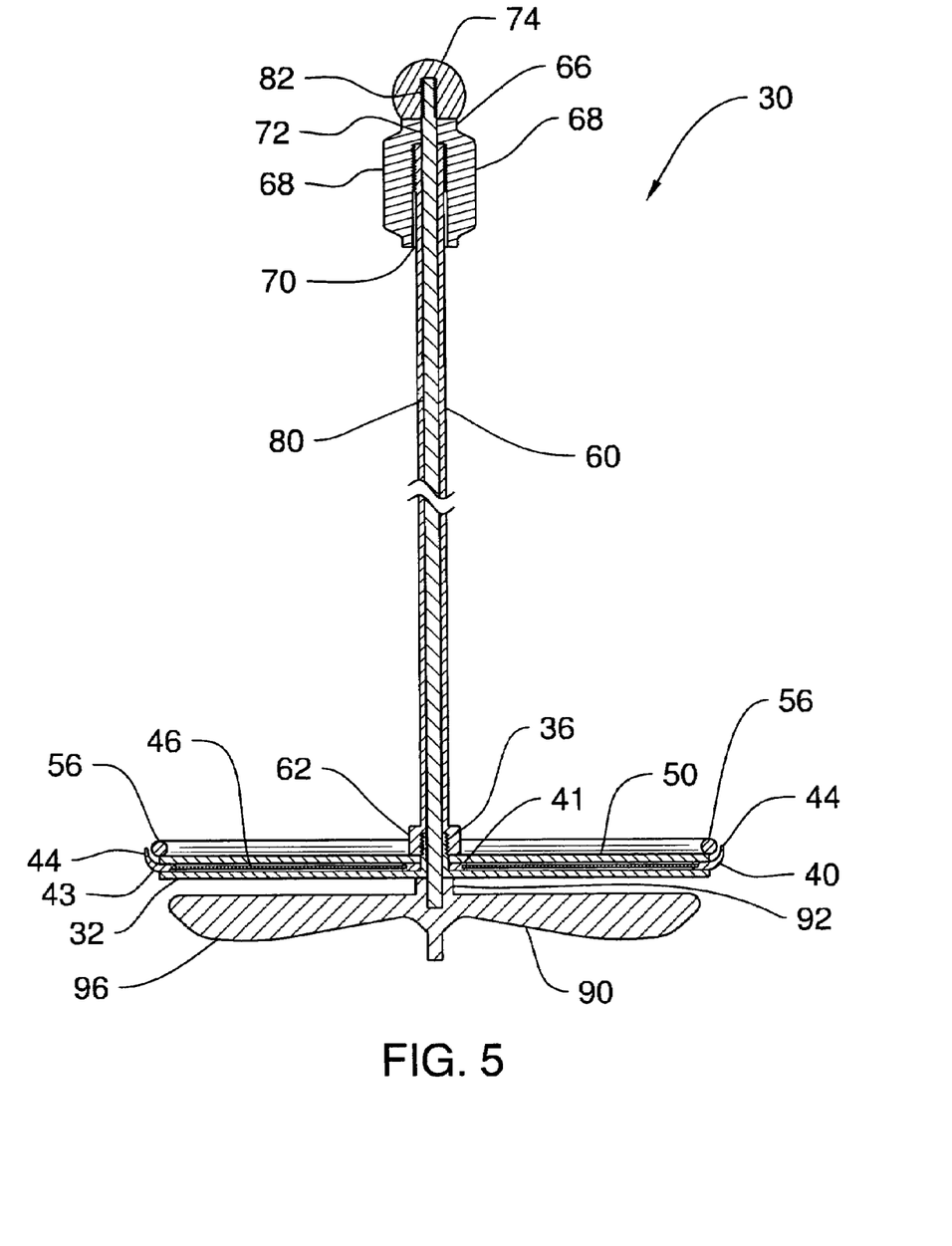
FIG. 5 is a cross-sectional view of the plunger and blade assembly of the stirring coffee press of the present invention.

In FIGS. 1 and 4, a new and improved stirring coffee press 10 of the present invention for agitating and pressing of beverage grounds in a container is illustrated and will be described. More particularly, the stirring coffee press 10 has a container 12, a lid 20, and a plunger assembly 30. The container 12 has a base and an open end, with a generally cylindrical configuration. The container 12 is made from any thermally resistant material, such as plastic, metal, glass, or the like, for allowing for the brewing of hot beverages therein. The container 12 can be modified to receive an insulated sleeve to keep the brewed beverage container in the container at an elevated temperature, and to protect the user from injury.

Figure 2:
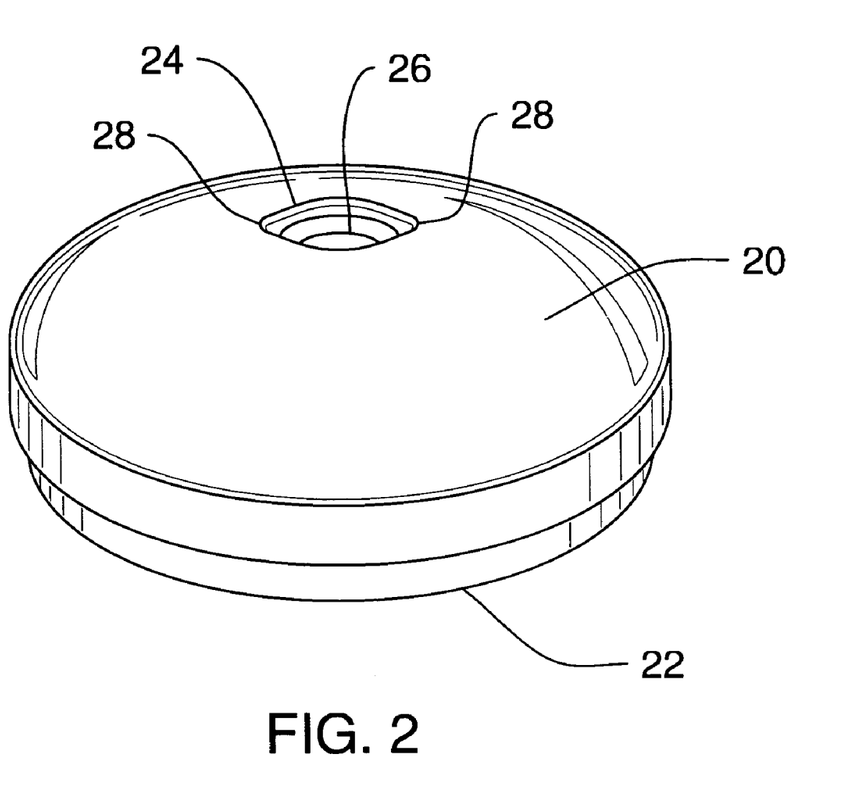
FIG. 2 is a perspective view of the lid of the stirring coffee press of the present invention.
Figure 3:
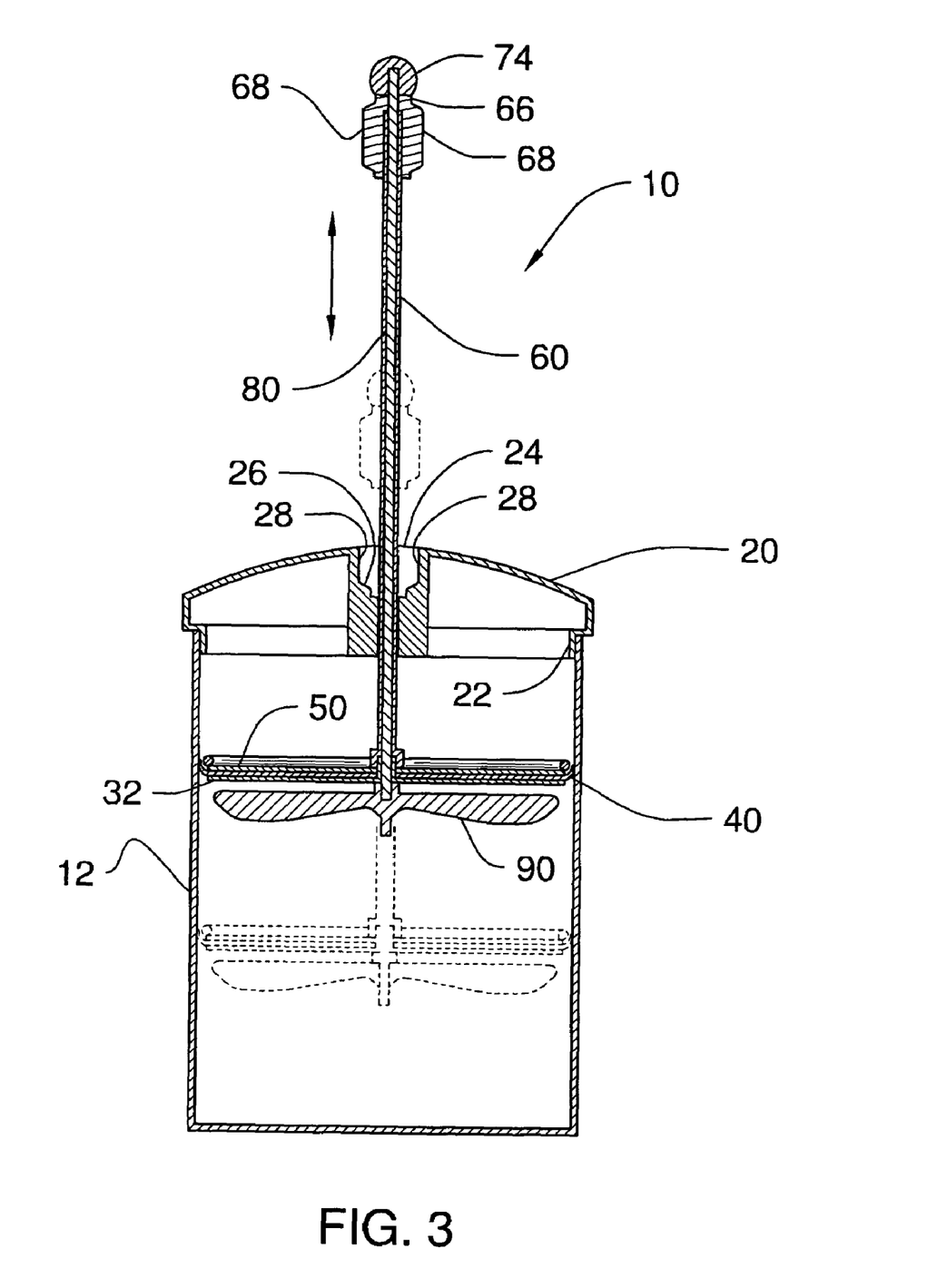
FIG. 3 is a cross-sectional view of the stirring coffee press of the present invention.
Figure 6:
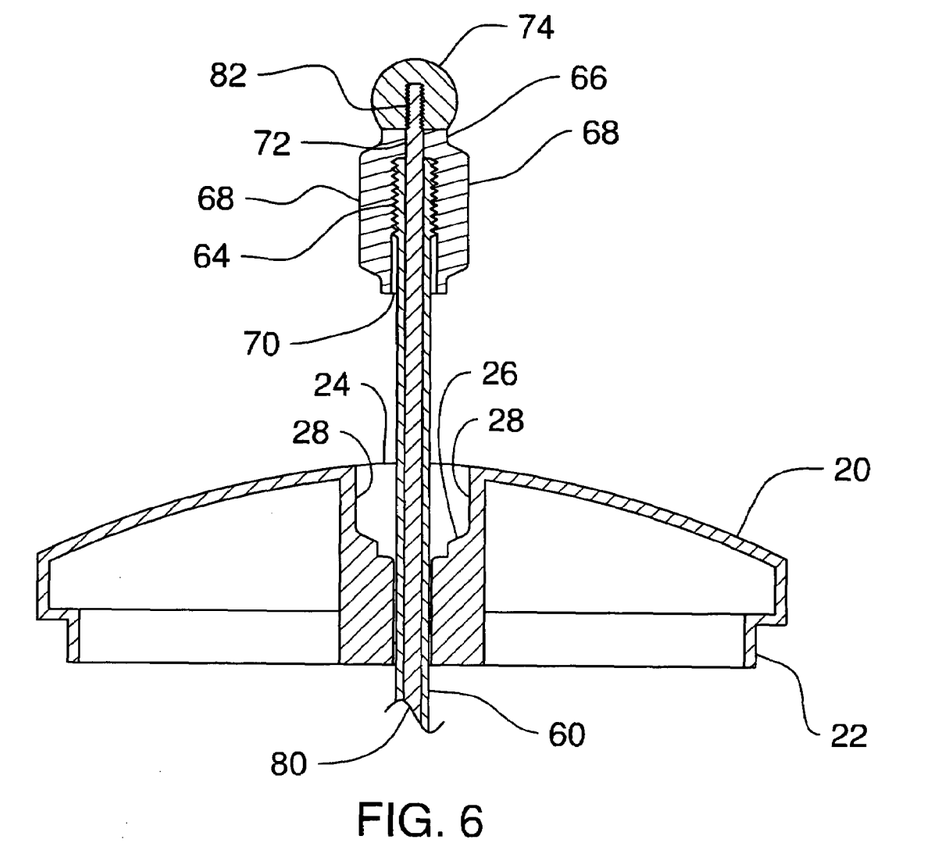
FIG. 6 is a cross-sectional view of the stirring coffee press of the present invention.

The lid 20 is adapted to be removably attached to the open end of the container 12, as illustrated in FIG. 2. The lid 20 has a recessed flange 22 which is adapted to be received in the open end of the container 12, and it is configured to correspond to a similar shape to that of the open end of the container. The recessed flange 22 of the lid 20 can be securely retained in the open end of the container by any known sealing and retaining connection system, such as a pressure fitted connection, a gasket sealed connection, an O-ring sealed connection, a mechanical latch connection, or the like. The lid 20 and container 12 connection prevents any liquid from leaking out of the produced joint, allowing for the liquid to be poured out of a spout. The lid 20 has an aperture 24 that extends through the lid. The aperture 24 features a pair of channels 28 which extend outwardly from the aperture, producing a generally oval-like configuration. The channels 28 project into the interior of the lid 20 a distance less than the thickness of the lid, thereby producing a cavity within the lid, as best illustrated in FIG. 3. The aperture 24 and channels 28 also include an inwardly extending rim 26 located at the bottom of the channels which travels around the inner periphery of the aperture and channels. The lower portion of the aperture 24 adjacent to the bottom of the channels 28 and the bottom of the lid 20 has a smaller diameter than the rim 26, as best illustrated in FIGS. 4 and 6.

Referring now to FIG. 3, the various components of the plunger assembly 30 will now be addressed. The plunger assembly 30 is slidably received within the container 12, and is configured so that it can be rotated therewithin. The plunger assembly 30 features a bottom plate 32, a screen plate 40, a compression plate 50, and an agitating blade system 90.

The bottom plate 32 is configured to correspond to the shape of container 12, and wherein the bottom plate is made from a rigid material. The bottom plate 32 has a plurality of radially defined apertures 34, and a hollow threaded stud 36 that extends outwardly from the central axis of the bottom plate 32.

The screen plate 40 is preferably positioned above the bottom plate 32, and which is configured to correspond to the shape of the container 12. A hub 41 is centrally defined in the screen plate 40, which features an aperture 42 having a diameter larger than the hollow threaded stud 36 of the bottom plate 32. The screen plate 40 has a rigid outer ring 43 featuring a flexible tapered end 44. The diameter of the outer ring 43 is larger than the diameter of the container 12, thereby allowing the tapered end 44 to press against the container to form a seal. A screen material 46 is attached to the hub 41 and the outer ring 43. The screen plate 40 is positioned over the bottom plate 32, allowing the threaded stud 36 to extend through the aperture 42 of the hub 41, illustrated best in FIG. 5.

Positioned above, but not limited thereto, is the compression plate 50, which features a plurality of radial perforations 52, and a centrally defined aperture 54. The aperture 54 has a diameter corresponding to the diameter of the aperture 42 of the hub 41 of the screen plate 40. The perforations 52 extend radially out from the central axis of the compression plate 50, and can vary or size or stay constant. An outer ring 56 is attached to the peripheral edge of the compression plate 50. The outer ring 56 provides for additional stiffness to the compression plate 50 so as to deter the flexing of the compression plate. The compression plate 50 has a smaller diameter than the screen plate 40, thereby positioning the outer ring 56 inward from the tapered end 44 of the outer ring 43, when the compression plate 50 placed above the screen plate 40 which is located above the bottom plate 32. The outer ring 56 also prevents the tapered end 44 from detaching from the container 12 and losing its seal against the container, as best illustrated in FIG. 3.

FIG. 4 further illustrates a hollow shaft 60 having internally threaded flanged end 62 and externally threaded end 64. The flanged end 62 is adapted to receive the hollow threaded stud 36, and has a diameter larger than the diameter of the aperture 54 of the compression plate 50 and the aperture 42 of the screen plate 40. The diameter of the hollow shaft 60 is less than the size of the aperture 24 of the lid 20, thereby allowing the hollow shaft 60 to extend through the aperture of the lid. FIG. 4 best illustrates the assembly of the compression plate 50, screen plate 40 and bottom plate 32 to the hollow shaft 60. In which the screen plate 40 and the compression plate 50 are stacked above the bottom plate 32 in a manner as to allow the threaded stud 36 to pass through and extend out from the aperture 42 of the screen plate 40 and the aperture 54 of the compression plate 50. Preferably, the screen plate 40 is positioned between the compression plate 50 and the bottom plate 32. When the threaded stud 36 of the bottom plate 32 is screwed into the flanged end 62, the compression plate 50 and the screen plate 40 would be securely pressed together between the bottom plate and the flanged end. This also allows for each plate 32, 40 and 50 to be removed.

Once the threaded end 64 of the hollow shaft 60 is extended through the aperture 24 of the lid 20, a handle 66 is attached to the thread end. The handle 66 features an internally thread bore 70 which is adapted to receive the threaded end 64 of the hollow shaft 60. The handle 66 includes a pair of outwardly extending detents 68 and a hole 72 centrally located and which extends down into the bore 70. The handle 66 and detents 68 are configured to correspond to the aperture 24 and the channels 28 of the lid 20. The detents 68 taper inward towards the handle 66 adjacent to the bottom end of the handle. The tapered portions of the detents 68 correspond to the inwardly extending rim 26 of the lid 20. This configuration allows the handle 66 to be inserted into the aperture 24 of the lid 20 when the detents 68 are aligned with channels 28 of the lid. The rim 26 prevents the handle 66 from inserting completely into the aperture 24 of the lid 20, as best illustrated in FIG. 6.

Figure 7:
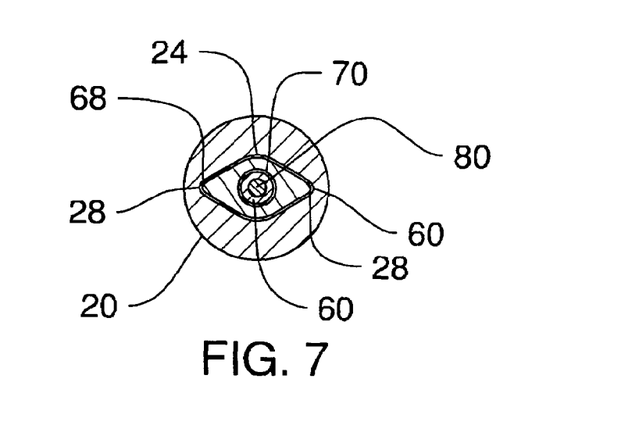
FIG. 7 is a cross-sectional view of the handle inserted in the lid of the stirring coffee press of the present invention.

FIG. 7 illustrates how the channels 28 prevent the handle 66 from rotating. If the handle 66 is rotated while inserted in aperture 24 of lid 20, the detents 68 contact channels 28 and prevent the handle 66 from rotating.

Figure 8:
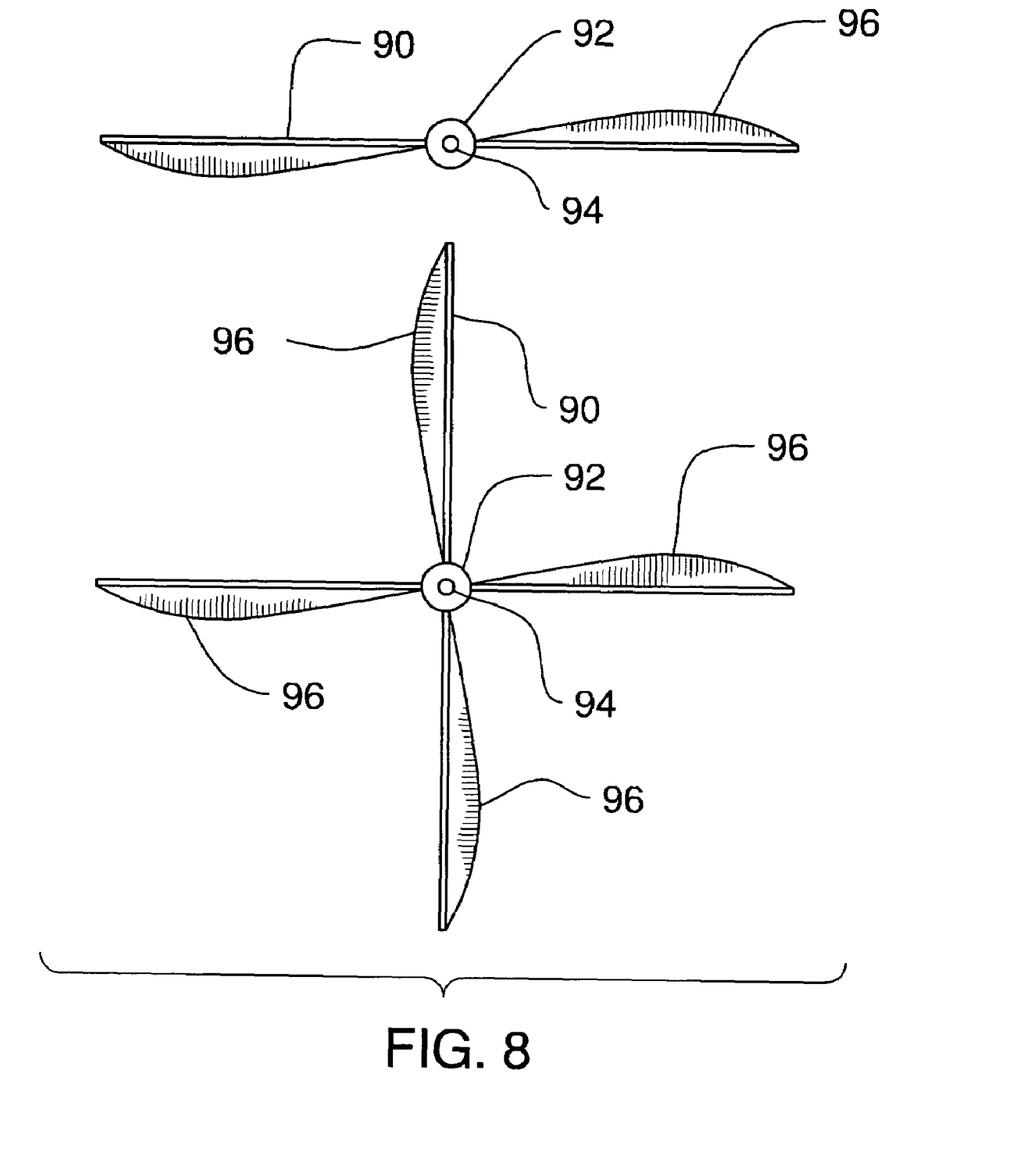
FIG. 8 is a top elevational view of the agitating blade of the stirring coffee press of the present invention.
Figure 9:
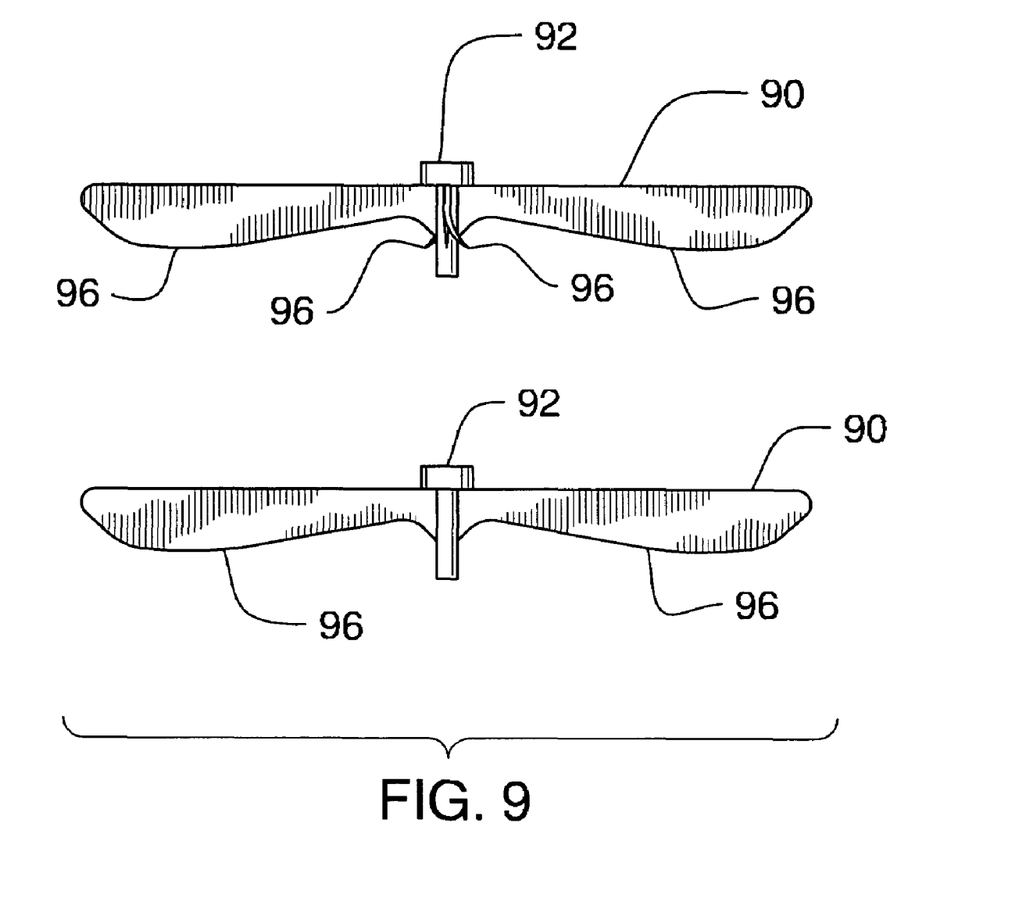
FIG. 9 is a front elevational view of the agitating blade of the stirring coffee press of the present invention.

The agitating blade system 90 contains a central hub 92 and a plurality of paddles 96 outwardly extending from the hub 92. There can be a variety of number of paddles 96 used in the agitating blade system 90. For example, a two or four paddle blade system 90 is illustrated in FIG. 8. The hub 92 has a cavity 94 extending therein. The cavity 94 is adapted to removably receive a shaft 80 including a threaded end 82. The hub 92 and the shaft 80 can be manufactured as a single piece. The diameter of the shaft 80 is smaller than the inner diameter of the hollow threaded stud 36 of the bottom plate 32, the hollow shaft 60 and the hole 72 of the handle 66, thereby allowing the shaft 80 to pass therethrough. When the shaft 80 is inserted through the hollow threaded stud 36, the hollow shaft 60 and the handle 66, the threaded end 82 extends out past the hole 72. To reduce friction between the shaft 80 and the handle 66, a ball bearing or bushing (not shown) can be inserted in the hole 70. The length of the shaft 80 has a length such that when tightly secured in place, the top of hub 92 and the bottom of bottom plate 32 will sufficient contact to allow for the paddles 96 to rotate freely. The length of shaft 80 is also adapted to allow the bottom of knob 74 and the top of handle 66 to rotate freely. A knob 74 is attached to the threaded end 82 of the shaft 80, rotatably securing the bottom plate 32, the screen plate 40, the compression plate 50, the hollow shaft 60 and the handle 66 between the knob 74 and the blade system 90. Rotation of the knob 74 transmits into rotation of the blade system 90, independent of the handle 66 and plates 32, 40 and 50. The length of a single paddle 96 is less than the diameter of the bottom plate 32, the screen plate 40, or the compression plate 50, thereby preventing the paddle from contacting and breaking the container 12. The paddles 96 taper from the hub 92 to a main paddle surface. The main paddle surface can be flat running parallel with the longitudinal axis of the hub 92 and shaft 80, or it can be arcuate. The arcuate paddle configuration is best illustrated in FIG. 9. The arcuate paddle has a trailing edge swept back from the above leading edge, wherein the swept back trailing edge tapers towards the hub 92 to form a flat edge parallel to the longitudinal axis of the hub, which produces a cork screw-like configuration.

The blade system 90 is designed to create a downward flow to stir the beverage grounds located beneath the bottom plate 32, while the plunger assembly 30 maintains a stationary position. The stirring of the beverage grounds breaks up any plug that might form beneath the plunger assembly 30, thereby eliminating a vacuum that forms between the plug and the plunger assembly or the bottom of the container 12. The stirring of the beverage grounds by the blade system 90 also improves the flavor of the beverage by allowing the hot water to more thoroughly brew with the grounds. The use of the arcuate configured paddles 96 also serves to push the plunger assembly 30 up from the bottom of the container 12, whereby the arcuate paddles act as a corkscrew when submerged in the beverage grounds when rotated.

Figure 10:
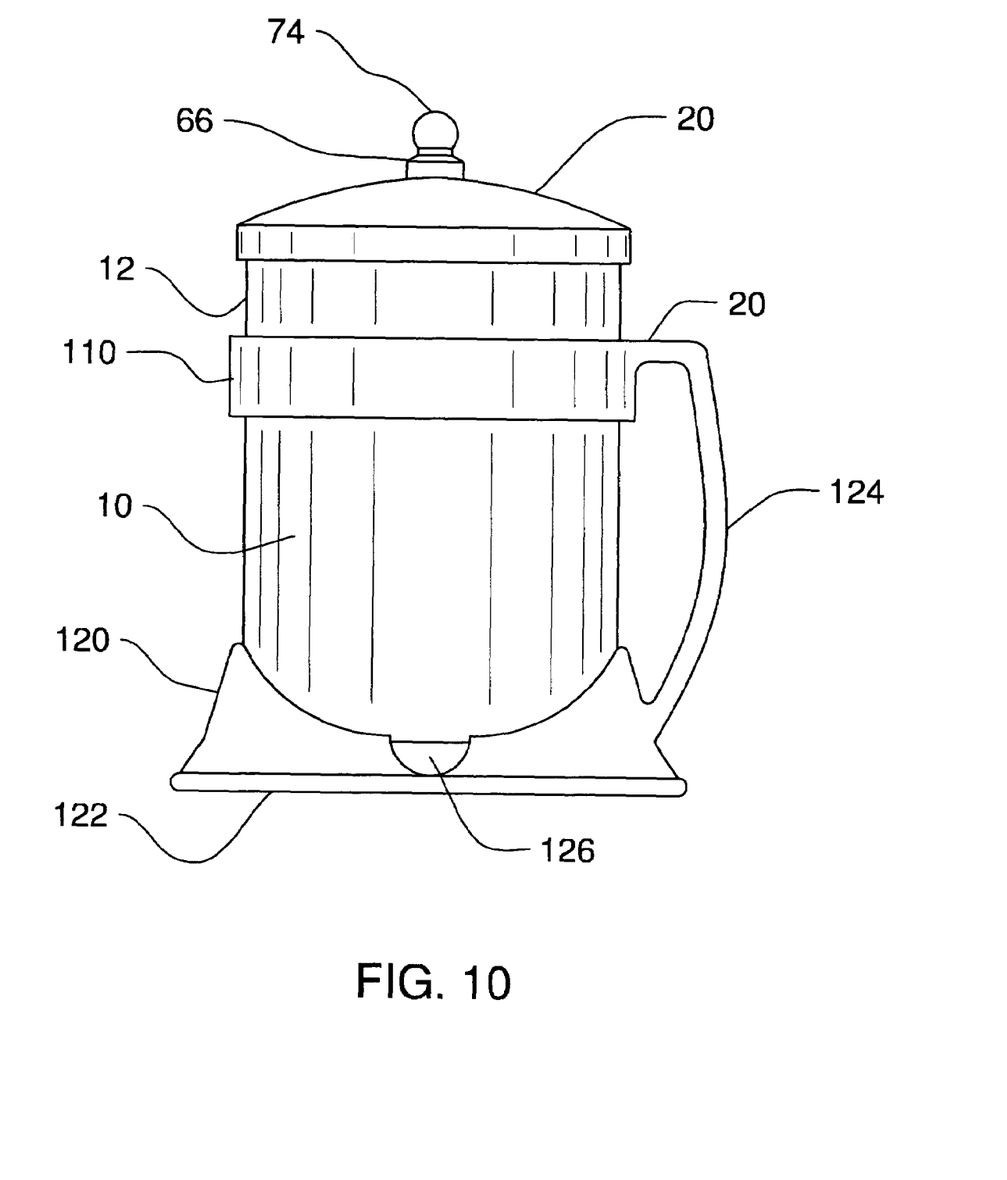
FIG. 10 is a side plan view of the handle unit of the stirring coffee press.
Figure 11:
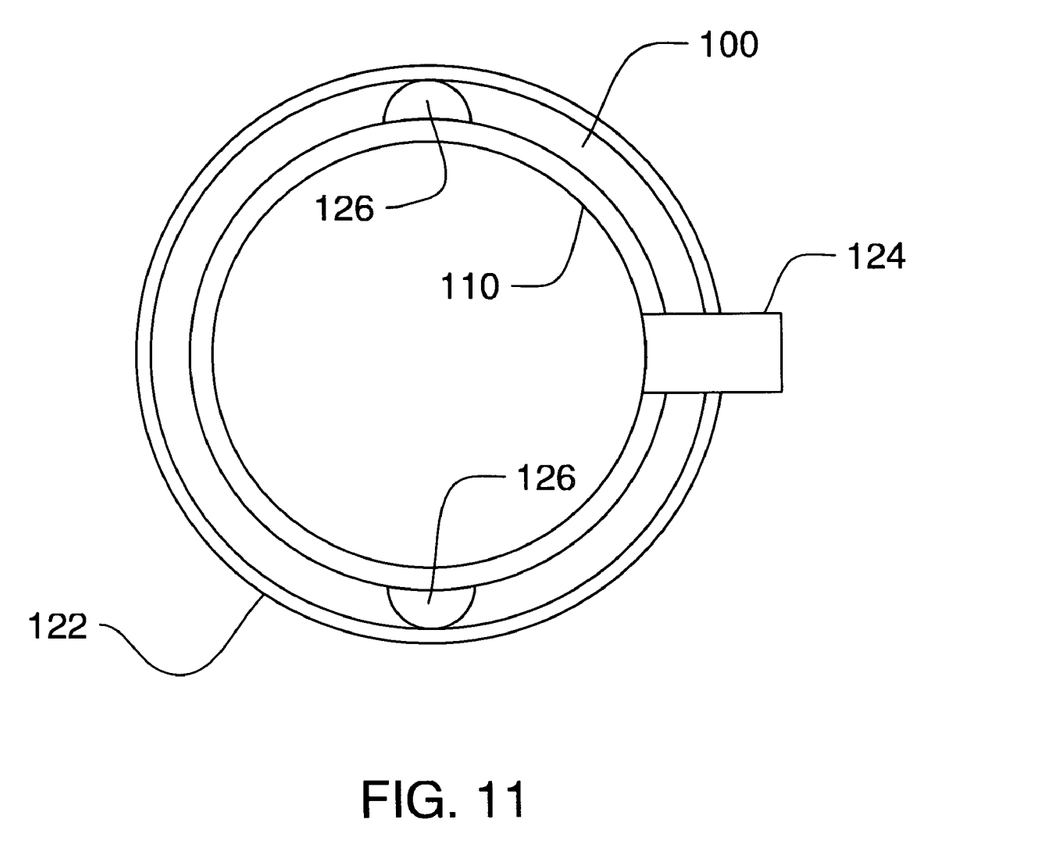
FIG. 11 is a top elevational view of the handle unit.

As best illustrated in FIG. 10, the stirring coffee press 10 can be support and transported by a handle unit 100. The handle unit 100 has a collar 110, a support member 120, a base 122, and a handle 124. The collar 110 is attached to the top portion of the handle 124 and has a diameter large enough to receive the container 12 of the stirring coffee press 12. The support member 120 has a cavity therein adapted to receive the bottom of the container 12, and wherein the support member is joined to the base 122. The other end of the handle 124 is attached to the support member 120. The support member 120 features at least one platform vent 126 allow for air to pass through the support member and under the stirring coffee press 10, thereby reducing the amount of condensation produced by the hot liquid in the stirring coffee press. Furthermore, FIG. 11 illustrates the platform vents 126, and their relationship with the handle unit 100.

Some of the overall designed functions of the stirring coffee press 10 is to serve as a subsurface stirring mechanism that stirs beverage grounds, breaks up beverage ground plugs that can form beneath the plunger assembly, and assist in pushing the plunger off the bottom of the container in the event a vacuum forms after depressing the plunger assembly. The stirring coffee press can be used to make any brewable beverage, such as coffee or tea.

In use, it can now be understood that the stirring coffee press can be used to produce any brewable beverage from grounds. A user would place beverage grounds in the bottom of the container and then fill the container with hot water. The plunger assembly and blade system is then inserted into the container and the lid is secured to the container. The plunger assembly and blade system are pushed down far enough to submerge the grounds allowing for the curing process to proceed. While the grounds are submerged in the hot water, the knob is rotated while the handle is held stationary. This mixes the grounds and the water, increasing the brewing process and the flavor of the beverage. After enough time has passed, the plunger assembly and blade system are pushed down further, forcing the grounds to the bottom of the container, thereby separating the liquid from the grounds. While the plunger assembly and blade system is being pushed down, the blade system can be rotated so as to further mix the grounds and to prevent the production of a ground plug. The prevention of a ground plug makes the pushing of the plunger assembly and blade system easier, because liquid flow resistance from the plug is eliminated. To push the plunger assembly and blade system to their lowest most position, the handle must be inserted into the aperture in the lid so as the handle detents align with lid aperture channels. The brewed beverage can now be poured from the container.

The plunger assembly and blade system can be removed from the container. The blade system can be rotated to break up any ground plug that might have formed in the bottom of the container. The blade system can also be rotated so that the paddles submerged in the grounds can act as a corkscrew, which forces the blade system and plunger assembly up, dislodging the plunger assembly from the grounds. By doing this, the vacuum produced by the upward movement of the plunger assembly is disturbed allowing for the easy removal of the plunger assembly and blade system.

While a preferred embodiment of the stirring coffee press has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, or a variety of wood may be used instead of the plastic or glass described. And although the agitating and pressing of coffee grounds have been described, it should be appreciated that the stirring coffee press herein described is also suitable for tea, or any and all brewable beverage grounds.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A stirring beverage brewing press system for brewing, agitation and compressing of beverage grounds in beverage press, said stirring beverage brewing press system comprising:
   a container including a side wall, an open end and a closed end;
   a stirring member adapted to be slidably inserted in said container, said stirring member having a shaft extending up therefrom;
   a plunger adapted to be slidably inserted in said container, said plunger having a hollowed shaft extending up therefrom;
   a handle attachable to said hollow shaft of said plunger opposite of said plunger, said handle comprises a bore therethrough adapted to receive said shaft of said stirring member;
   wherein said hollow shaft of said plunger is adapted to receive said shaft of said stirring member, thereby allowing said stirring member and said shaft to rotate freely and independently from said plunger and said hollow shaft; and
   a handle unit adapted to receive said container, wherein said handle unit having at least one ventilation part.

2. The stirring beverage brewing press system as set forth in claim 1 further comprising a lid, said lid having a cavity positioned on the top surface of said lid and sized to receive said handle, wherein said lid has an aperture defined from the bottom of said cavity to the bottom of said lid, said aperture being adapted to allow said hollow shaft to extend therethrough.

3. The stirring beverage brewing press system as set forth in claim 2, wherein said handle includes at least one detent projecting from said handle, and said cavity of said lid includes at least one channel configured to receive said detent of said handle.

4. The stirring beverage brewing press system as set forth in claim 1, wherein said plunger is a perforated plate.

5. The stirring beverage brewing press system as set forth in claim 1, wherein said plunger is a screened plate.

6. The stirring beverage brewing press system as set forth in claim 1, wherein said plunger comprises a perforated bottom plate, a screen plate, and a perforated upper plate.

7. A stirring beverage brewing press system comprising:
   a cylindrical container including a side wall, an open end and a closed end;
   a stirring member adapted to be slidably inserted in said container, said stirring member having a plurality of paddles;
   a shaft removably attachable to said stirring member and extending up therefrom;
   a knob attachable to said shaft opposite of said stirring member;
   a perforated plunger adapted to be slidably inserted in said container, said plunger having a plurality of apertures defined therethrough;
   a hollow shaft attachable to said perforated plunger and extending up therefrom;
   a screen plate adapted to be slidably inserted in said container, said screen plate having a screen, a rigid outer ring attached to the peripheral edge of said screen, and a hole defined through said screen plate adapted to receive said hollow shaft;
   a perforated compression plate adapted to be slidably inserted in said container, said compression plate having a plurality of perforations, and a centrally defined aperture adapted to receive said hollow shaft;
   a handle attachable to said hollow shaft opposite of said perforated plunger, said handle having at least two outwardly extending detents and a bore defined therethrough which is adapted to receive said shaft of said stirring member therethrough;
   a lid attachable to said open end of said container, said lid defining an aperture therethrough, a cavity located adjacent said aperture, at least two channels extending outwardly from said cavity, and an inwardly extending rim located at the bottom of said channels and which travels around the inner periphery of said aperture and channels, said aperture being adapted to allow said hollow shaft to extend therethrough, said cavity being adapted to receive said handle, said channels being adapted to received said detents of said handle and preventing said handle from rotating when said handle is inserted in said cavity, said rim being adapted to prevent said handle from traveling further down said aperture; and
   wherein said hollow shaft of said perforated plunger is adapted to receive said shaft of said stirring member thereby allowing said stirring member and said shaft to rotate freely and independently from said plunger and said hollow shaft.

8. The stirring beverage brewing press system as set forth in claim 7, wherein said stirring member further comprising a central hub, said paddles outwardly extending from said hub, said hub having a cavity defined therein.

9. The stirring beverage brewing press system as set forth in claim 8, wherein said shaft being insertably attached to said cavity of said hub of said stirring member and extending up therefrom.

10. The stirring beverage brewing press system as set forth in claim 7, wherein said perforated plunger further comprising a stud extending up therefrom featuring a bore defined therethrough.

11. The stirring beverage brewing press system as set forth in claim 10, wherein said screen plate further comprising a hub, said screen being attached to said hub, said hub having a hole defined therethrough able to receive said stud of said perforated plunger.

12. The stirring beverage brewing press system as set forth in claim 7, wherein said outer ring of said screen plate having a flexible tapered end, said flexible tapered end of said outer ring having a diameter larger than the diameter of said container, thereby allowing said tapered end to press against said container to form a seal.

13. The stirring beverage brewing press system as set forth in claim 7, wherein said perforated compression plate having an outer ring attachable to the peripheral edge of said compression plate.

14. The stirring beverage brewing press system as set forth in claim 7 further comprising a handle unit adapted to receive said container, wherein said handle unit having at least on ventilation port.

15. A stirring beverage brewing press system comprising:
a cylindrical container including a side wall, an open end and a closed end;
a stirring member adapted to be slidably inserted in said container, said stirring member having a central hub, and a plurality of paddles outwardly extending from said hub, said hub having a cavity defined therein;
a shaft insertably attached to said cavity of said hub of said stirring member and extending up therefrom;
a knob removably attachable to said shaft opposite of said stirring member;
a perforated plunger adapted to be slidably inserted in said container, said plunger having a stud extending up therefrom featuring a bore defined therethrough, and a plurality of radially defined apertures;
a hollow shaft attachable to said stud of said perforated plunger and extending up therefrom;
a screen plate adapted to be slidably inserted in said container and positioned above said perforated plunger, said screen plate having a hub, a screen attached to said hub, and a rigid outer ring attached to the peripheral edge of said screen, said outer ring featuring a flexible tapered end, said hub having a hole defined therethrough able to receive said stud of said perforated plunger;
a perforated compression plate adapted to be slidably inserted in said container and positioned above said screen plate and retained between said hollow shaft and said perforated plunger, said compression plate having a plurality of radial perforations, a centrally defined aperture able to receive said stud of said perforated plunger, and an outer ring attachable to the peripheral edge of said compression plate;
a handle attachable to said hollow shaft opposite of said perforated plunger, said handle having at least two outwardly extending detents, and a bore defined therethrough which is adapted to receive said shaft of said stirring member therethrough;
a lid attachable to said open end of said container, said lid defining an aperture therethrough, a cavity located adjacent said aperture, at least two channels extending outwardly from said cavity, and an inwardly extending rim located at the bottom of said channels and which travels around the inner periphery of said aperture and channels, said aperture being adapted to allow said hollow shaft to extend therethrough, said cavity being adapted to receive said handle, said channels being adapted to received said detents of said handle and preventing said handle from rotating when said handle is inserted in said cavity, said rim being adapted to prevent said handle from traveling further down said aperture; and
wherein said hollow shaft of said perforated plunger is adapted to receive said shaft of said stirring member thereby allowing said stirring member and said shaft to rotate freely and independently from said plunger and said hollow shaft.

16. The stirring beverage brewing press system as set forth in claim 15, wherein said flexible tapered end of said screen plate having a diameter larger than the diameter of said container, thereby allowing said tapered end to press against said container to form a seal.

* * * * *